United States Patent Office 2,998,320
Patented Aug. 29, 1961

2,998,320
CERAMIC COMPOSITIONS
James H. Strimple, Milltown, N.J., assignor to National Lead Company, New York, N.Y., a corporation of New Jersey
No Drawing. Filed Nov. 12, 1959, Ser. No. 852,224
6 Claims. (Cl. 106—48)

This invention relates to ceramic frit compositions and ceramic glazes. More specifically, this invention relates to a frit composition from which a ceramic glaze, opacified and whitened with $TiO_2$ may be prepared. In particular, this invention relates especially to a frit composition of the alkali, alkaline earth, alumino-silicate type from which is obtained an opacified titanium containing glaze.

To be useful in the coating of ceramic bodies, a glaze must exhibit certain properties. It is necessary, first of all, for the glaze to have a coefficient of thermal expansion similar to that of the substrate ceramic material; otherwise undue stresses will be set up during the cooling of the fired piece resulting in spalling, cracking, chipping or crazing. Aside from the necessary limitations on the coefficient of expansion, other properties are desirable in a decorative glaze. Among these may be mentioned high opacity, gloss, durability at moderate maturing temperature, and purity of color. However it has been found that glazes of this type are sometimes sensitive to light, which characteristic is undesirable. This light sensitivity, sometimes referred to as photosensitivity, is due mainly to the presence, in the frit, of raw materials which contain relatively large amounts of compounds of transition elements reactive to light and, therefore, the resultant glazes retain in varying degrees, these photosensitive properties.

It is, therefore, an object of the present invention to provide a frit composition from which an improved ceramic glaze can be produced. It is a further object to provide a ceramic glaze of high opacity which is relatively insensitive to light. These and other objects and advantages will become apparent from the following more complete description and claims.

In its broadest aspects, this invention contemplates a ceramic glaze, sometimes referred to as a base glaze, consisting essentially of $SiO_2$ in amount from about 46 to about 61 percent, $Al_2O_3$ in amount from about 8 to about 16 percent, $TiO_2$ in amount from about 6 to about 15 percent, alkali metal oxide or oxides selected from the group consisting of $Na_2O$ and $K_2O$, in amount from about 5 to about 18 percent, alkaline earth metal oxide selected from the group consisting of CaO, MgO and SrO, in amount from about 6 to about 14 percent, all of the percentages expressed on a weight basis. In order to insure against photosensitivity it is desirable to add to said glaze from about 0.2 to about 8 percent of a compound selected from the group consisting of antimony oxide, tantalum oxide and tungsten oxide.

The instant invention also contemplates modifications of above described base glaze in which other oxides are present in the composition. For example, other oxides may be substituted for a portion of the alkaline earth metal oxide. These include barium oxide, lead oxide, cadmium oxide and zinc oxide and may replace on a mole basis up to ⅓ of the alkaline earth metal oxide in the composition.

It is also desirable in some instances to add, in addition to the above oxides, fluorine in an amount up to 3 percent and $P_2O_5$ in amount up to 4 percent by weight. Lithium oxide may also be substituted for the sodium oxide in amount up to ⅓ of the sodium oxide on a mole basis, zirconium dioxide may be added and may replace up to one-half the titanium dioxide on a mole basis.

As stated at the outset the glazes of this invention are insensitive to light and this improvement over earlier glazes has been achieved by the presence of antimony oxide, tantalum oxide or tungsten oxide in the glaze. It has been found however, that the latter oxides should be added as frit additions in order to be most effective. In as much as these glazes contain small quantities of oxides of antimony, tantalum, or tungsten, they are not photosensitive and hence have real commercial value.

In preparing the glazes of the instant invention, a frit composition containing the oxides of antimony, tantalum or tungsten is prepared by fusing a mixture of the various ingredients to provide complete intersolution. The fused mixture is then usually quenched in water and subsequently milled with the usual mill additions. These glazes may be either of the "recrystallizing" type by which is meant that they are pigmented by precipitation, during the maturing heat, of titanium values present as a melted-in constituent of the frit; or they may be pigmented by the titanium values added to the frit as a mill addition. It does not matter whether the titanium values are present as a component of the frit batch or as mill addition. In either case the glaze provided by the instant invention is resistant to photosensitivity provided the oxides of antimony, tantalum or tungsten are present as a constituent of the frit.

These glazes may be applied to common ceramic materials such as wall tile, terra cotta, earthenware and structural clay bodies in any ordinary manner as by dipping, brushing or spraying, the compositions maturing at temperatures in the range of 950–1200° C. to produce highly opaque durable white glazes.

In order to more fully illustrate the instant invention, the following examples are presented.

EXAMPLE 1

A frit composition was prepared by melting together for about one hour, at about 1380° C. a mixture of the following ingredients:

| | Parts by wt. |
|---|---|
| Potters flint | 48.2 |
| Aluminum oxide | 10.4 |
| Sodium carbonate | 14.4 |
| Potassium carbonate | 4.9 |
| Calcium carbonate | 9.7 |
| Titanium dioxide | 12.0 |
| Antimony trioxide | 0.4 |

The calculated composition of the resulting frit, expressed in weight percentages, was as follows:

| Component: | Weight percent |
|---|---|
| $SiO_2$ | 54.9 |
| $Al_2O_3$ | 11.7 |
| CaO | 6.2 |
| $Na_2O$ | 9.6 |
| $K_2O$ | 3.8 |
| $TiO_2$ | 13.4 |
| $Sb_2O_3$ | 0.45 |

When complete intersolution was achieved and the frit composition was clear, the frit was quenched in water. One hundred parts of this quenched frit were ball-milled for 18 hours along with 4 parts of clay, 0.25 part of $NaNO_2$, 0.25 part of $K_2CO_3$ and 40 parts of demineralized water. The milled frit was then strained through a 200 mesh screen to insure the absence of any coarse particles. The strained slip was well dispersed and of sprayable consistency.

The milled slip was then sprayed onto a bisqued wall tile panel at a dry application weight of about 30 grams per square foot, dried for several hours at 150° C. and then fired under oxidizing conditions (air atmosphere) at 1100° C. The kiln required about seven hours to reach this temperature, and after being held at the maximum temperature for about one-half hour, heating was discontinued and the kiln was allowed to cool overnight. The resulting glaze was smooth, glossy, continuous and possessed an excellent white color.

One-half of the glaze surface was then masked with opaque, black masking tape and the unmasked portion was exposed for one hour to ultra-violet radiation. After one hour exposure to ultra-violet radiation the tape was removed from the unexposed portion of the glaze surface and visual comparison was made between the exposed and unexposed portions. No evidence of discoloration due to a photosensitive reaction could be discerned indicating that the antimony trioxide in the frit composition was effective in preventing photosensitivity.

For comparison a frit-composition was prepared substantially identical to the one previously described except that the antimony oxide was omitted as an ingredient. The glaze produced from the antimony free frit was photosensitive upon exposure to ultra-violet light.

EXAMPLES 2–20

Using the same procedure as that described in Example 1, other frit compositions and glazes were prepared by mixing various quantities of ingredients to produce frits having a variety of compositions which fall within the ranges contemplated by the instant invention and ceramic glazes were prepared from such frit compositions. The amounts of ingredients employed and the frit compositions obtained along with the smelting and firing temperatures are recorded with the data of Example 1 in Table 1.

Table 1

OPERATING DATA OF FRIT COMPOSITIONS

| Ingredients Added | Parts by Weight Examples | | | | | |
|---|---|---|---|---|---|---|
| | 1 | 2 | 3 | 4 | 5 | 6 |
| Potters Flint | 48.2 | 48.0 | 48.9 | 44.0 | 46.4 | 44.1 |
| Aluminum Oxide | 10.4 | 11.1 | 10.0 | 7.8 | 10.5 | 13.3 |
| Sodium Carbonate | 14.4 | 5.7 | 10.4 | 9.2 | 12.6 | 12.1 |
| Potassium Carbonate | 4.9 | 8.5 | 6.6 | 7.8 | 9.1 | 8.9 |
| Calcium Carbonate | 9.7 | 8.9 | 9.8 | 8.7 | 10.7 | |
| Magnesium Carbonate | | | | 11.2 | | 8.6 |
| Sodium Silica Fluoride | | 5.5 | | | | |
| Lithium Oxide | | | 2.0 | | | |
| Titanium Dioxide | 12.0 | 11.9 | 11.9 | 10.7 | 10.4 | 12.5 |
| Antimony Trioxide | 0.4 | 0.4 | 0.4 | 0.4 | | |
| Tungsten Oxide | | | | | 0.3 | |
| Tantalum Oxide | | | | | | 0.5 |

| Frit Composition | Weight Percents Examples | | | | | |
|---|---|---|---|---|---|---|
| | 1 | 2 | 3 | 4 | 5 | 6 |
| $SiO_2$ | 54.9 | 54.0 | 55.7 | 55.0 | 53.2 | 50.3 |
| $Al_2O_3$ | 11.7 | 12.1 | 11.3 | 9.8 | 12.1 | 15.2 |
| CaO | 6.2 | 5.5 | 6.3 | 6.2 | 6.8 | |
| $Na_2O$ | 9.2 | 7.5 | 6.8 | 7.8 | 8.5 | 8.2 |
| $K_2O$ | 3.8 | 6.3 | 5.1 | 6.6 | 7.2 | 6.8 |
| $TiO_2$ | 13.4 | 13.0 | 13.5 | 13.5 | 11.9 | 14.2 |
| MgO | | | | 0.66 | | 4.7 |
| $Li_2O$ | | | 0.9 | | | |
| $Sb_2O_3$ | 0.45 | 0.45 | 0.45 | 0.45 | | |
| $F_2$ | | 1.2 | | | | |
| $WO_3$ | | | | | 0.3 | |
| $Ta_2O_5$ | | | | | | 0.6 |
| Smelting Temp. (° C.) | 1,380 | 1,430 | 1,380 | 1,410 | 1,440 | 1,400 |
| Firing Temp. (° C.) | 1,100 | 1,100 | 1,100 | 1,050 | 1,100 | 1,100 |

| Ingredients Added | Parts by Weight Examples | | | | | |
|---|---|---|---|---|---|---|
| | 7 | 8 | 9 | 10 | 11 | 12 |
| Potters Flint | 121.7 | 111.1 | 115.2 | 114.0 | 115.5 | 113.0 |
| Aluminum Oxide | 20.4 | 26.2 | 20.0 | 26.5 | 26.9 | 34.0 |
| Sodium Carbonate | 33.2 | 26.5 | 17.2 | 31.0 | 31.4 | 31.1 |
| Potassium Carbonate | 24.0 | 22.2 | 23.1 | 22.6 | 22.6 | 22.5 |
| Calcium Carbonate | 28.0 | 25.8 | 46.1 | 20.0 | 20.0 | |
| Strontium Carbonate | | | | | | 38.4 |
| Magnesium Carbonate | | | | 2.7 | 2.7 | |
| Barium Carbonate | | | | 6.7 | | |
| Zinc Carbonate | | | | | 4.2 | |
| Sodium Fluoride | | 5.7 | | | | |
| Titanium Dioxide | 26.7 | 30.9 | 31.7 | 31.4 | 31.7 | 32.0 |
| Antimony Trioxide | 5.0 | | | 19.4 | | 1.9 |
| Tungsten Oxide | | | 7.7 | | | |
| Tantalum Oxide | | 7.4 | | | 14.7 | |

| Frit Composition | Weight Percents Examples | | | | | |
|---|---|---|---|---|---|---|
| | 7 | 8 | 9 | 10 | 11 | 12 |
| $SiO_2$ | 54.0 | 48.9 | 52.4 | 47.1 | 48.7 | 46.8 |
| $Al_2O_3$ | 9.1 | 11.5 | 9.1 | 10.9 | 11.2 | 14.0 |
| CaO | 7.0 | 6.3 | 11.7 | 4.5 | 4.6 | |
| $Na_2O$ | 8.5 | 7.8 | 4.7 | 7.6 | 7.7 | 7.5 |
| $K_2O$ | 7.3 | 6.6 | 7.1 | 6.3 | 6.5 | 6.4 |
| $TiO_2$ | 11.9 | 13.5 | 14.4 | 12.9 | 13.5 | 13.3 |
| SrO | | | | | | 11.2 |
| MgO | | | | 0.6 | 0.6 | |
| BaO | | | | 2.1 | | |
| ZnO | | | | | 1.1 | |
| $F_2$ | | 2.2 | | | | |
| $Sb_2O_3$ | 2.2 | | | 8.0 | | 0.8 |
| $Ta_2O_5$ | | 3.2 | | | 6.2 | |
| $WO_3$ | | | 0.6 | | | |
| Smelting Temp. (° C.) | 1,250 | 1,380 | 1,350 | 1,380 | 1,400 | 1,400 |
| Firing Temp. (° C.) | 1,050 | 1,075 | 1,150 | 1,050 | 1,050 | 1,050 |

| Ingredients Added | Parts by Weight Examples | | | |
|---|---|---|---|---|
| | 13 | 14 | 15 | 16 |
| Potters Flint | 116.0 | 116.0 | 110.0 | 116.0 |
| Aluminum Oxide | 27.2 | 27.2 | 34.0 | 27.2 |
| Sodium Carbonate | 31.8 | 31.8 | 24.0 | 24.7 |
| Potassium Carbonate | 23.0 | 23.0 | 21.8 | 13.8 |
| Calcium Carbonate | 20.0 | 26.7 | 25.3 | 26.7 |
| Cadmium Carbonate | 11.5 | | | |
| Lithium Carbonate | | | | 9.8 |
| Zirconium Oxide | | 24.6 | | |
| Monobasic Sodium Phosphate | | | 18.4 | |
| Titanium Dioxide | 32.0 | 16.0 | 32.0 | 32.0 |
| Orthoboric Acid | | | | |
| Antimony Trioxide | | | 1.9 | 1.9 |
| Tungsten Oxide | | 1.5 | | |
| Tantalum Oxide | 2.9 | | | |

| Frit Composition | Weight Percents Examples | | | |
|---|---|---|---|---|
| | 13 | 14 | 15 | 16 |
| $SiO_2$ | 49.2 | 49.1 | 47.1 | 52.6 |
| $Al_2O_3$ | 11.4 | 11.4 | 14.4 | 12.3 |
| CaO | 4.8 | 7.1 | 6.1 | 6.8 |
| $Na_2O$ | 7.9 | 7.9 | 7.6 | 6.6 |
| $K_2O$ | 6.7 | 6.6 | 6.3 | 4.2 |
| $TiO_2$ | 13.6 | 6.8 | 13.7 | 14.5 |
| CdO | 5.1 | | | |
| $P_2O_5$ | | | 4.0 | |
| $Li_2O$ | | | | 1.8 |
| $ZrO_2$ | | 10.4 | | |
| $B_2O_3$ | | | | |
| $Sb_2O_3$ | | | 0.8 | 1.2 |
| $WO_3$ | | 0.7 | | |
| $Ta_2O_5$ | 1.3 | | | |
| Smelting Temp. (° C.) | 1,380 | 1,480 | 1,460 | 1,380 |
| Firing Temp. (° C.) | 1,050 | 1,125 | 1,050 | 1,040 |

| Ingredients Added | Parts by Weight — Examples | | | |
|---|---|---|---|---|
| | 17 | 18 | 19 | 20 |
| Potters Flint | 134.5 | 132.0 | 155.2 | 155.2 |
| Aluminum Oxide | 22.4 | 22.4 | 20.4 | 20.4 |
| Sodium Carbonate | 33.2 | 26.4 | 28.4 | 30.4 |
| Potassium Carbonate | 33.2 | 24.4 | 2.8 | |
| Calcium Carbonate | 38.0 | 38.0 | 54.4 | 54.4 |
| Cadmium Carbonate | | | | |
| Lithium Carbonate | | | | |
| Zirconium Oxide | | | | |
| Monobasic Sodium Phosphate | | | | |
| Titanium Dioxide | 38.4 | 38.0 | 31.6 | 31.6 |
| Orthoboric Acid | 14.8 | 34.8 | | |
| Antimony Trioxide | 2.0 | 2.0 | 1.8 | 1.8 |
| Tungsten Oxide | | | | |
| Tantalum Oxide | | | | |

| Frit Composition | Weight Percents — Examples | | | |
|---|---|---|---|---|
| | 17 | 18 | 19 | 20 |
| $SiO_2$ | 49.9 | 49.0 | 60.4 | 60.4 |
| $Al_2O_3$ | 8.3 | 8.3 | 7.9 | 7.9 |
| CaO | 7.9 | 7.9 | 11.9 | 11.9 |
| $Na_2O$ | 7.1 | 6.0 | 6.5 | 7.2 |
| $K_2O$ | 8.3 | 6.1 | 0.7 | |
| $TiO_2$ | 14.2 | 14.2 | 11.9 | 11.9 |
| CdO | | | | |
| $P_2O_5$ | | | | |
| $Li_2O$ | | | | |
| $ZrO_2$ | | | | |
| $B_2O_3$ | 3.1 | 7.3 | | |
| $Sb_2O_3$ | 1.2 | 1.2 | 0.7 | 0.7 |
| $WO_3$ | | | | |
| $Ta_2O_5$ | | | | |
| Smelting Temp. (° C.) | 1,380 | 1,380 | 1,525 | 1,525 |
| Firing Temp. (° C.) | 1,180 | 1,180 | 1,200 | 1,200 |

In the foregoing examples the addition agents used to prevent photosensitivity of the glazes were added to self-opacifying frits containing $TiO_2$. In order to show the effect of these same addition agents in $TiO_2$ opacified glazes in which the $TiO_2$ is added as a mill addition, the following examples are given.

EXAMPLES 21–22

Frit compositions were prepared by melting together the constituents described above for one hour at 1400° C. except that these frit compositions contained no titanium dioxide.

These frits were then milled with the addition of 12% $TiO_2$ as one of the mill additions and the slips formed were sprayed on bisque tile and fired at various temperatures. The operating data and results are recorded in Table II. In these examples none of the resulting glazes showned photosensitivity when exposed to ultra-violet light.

Table II

OPERATING DATA OF FRIT COMPOSITIONS

| Ingredients Added | Parts by Weight — Examples | |
|---|---|---|
| | 19 | 20 |
| Potters Flint | 144.0 | 147.0 |
| Aluminum Oxide | 23.6 | 24.4 |
| Sodium Carbonate | 40.8 | 38.4 |
| Potassium Carbonate | 27.6 | 27.6 |
| Calcium Carbonate | 56.0 | 44.0 |
| Zinc Carbonate | 10.0 | |
| Lithium Carbonate | 8.8 | 6.0 |
| Magnesium Carbonate | | 19.6 |
| Antimony Trioxide | 2.0 | 2.0 |

| Frit Composition | Weight Percents — Examples | |
|---|---|---|
| | 19 | 20 |
| $SiO_2$ | 56.4 | 58.3 |
| $Al_2O_3$ | 9.2 | 9.7 |
| $Na_2O$ | 9.7 | 8.9 |
| $K_2O$ | 7.3 | 7.4 |
| CaO | 12.3 | 9.8 |
| ZnO | 2.5 | |
| $Li_2O$ | 1.4 | 1.0 |
| MgO | | 3.6 |
| $Sb_2O_3$ | 1.2 | 1.3 |
| $TiO_2$ added as mill addition | 9.6 | 9.6 |
| Firing Temperature (° C.) | | 1,200 |

In all of these examples the compositions of the frits have been varied to show specific examples which fall within the ranges of composition contemplated by the instant invention.

This application is a continuation-in-part of my application Serial No. 600,686 filed July 30, 1956, and now abandoned.

From the above description and by the examples presented, frit compositions containing various constituents have been produced from which non-photosensitive ceramic glazes have been prepared. These glazes are durable, possess high gloss, are highly opacified and have coefficient of expansion which are useful for a variety of ceramic materials.

While this invention has been described and illustrated by the examples shown, it is not intended to be strictly limited thereto, and other modifications and variations may be employed within the scope of the following claims.

I claim:

1. A ceramic glaze consisting essentially of $SiO_2$ in amount from about 46 to about 61 percent, $Al_2O_3$ in amount from about 8 to about 16 percent, $TiO_2$ in amount from about 6 to about 15 percent, an alkali metal oxide selected from the group consisting of $Na_2O$, $K_2O$ and mixtures thereof, said alkali metal oxides being present in amount from about 5 to about 18 percent, an alkaline earth metal oxide selected from the group consisting of CaO, MgO and SrO and mixtures thereof, said alkaline earth metal oxide being present in amount from about 6 to about 14 percent, said glaze also containing from about 0.2 to about 8 percent of a compound selected from the group consisting of antimony oxide, tantalum oxide and tungsten oxide, all percentages expressed on a weight basis, thereby preventing photosensitivity in said glaze.

2. Composition according to claim 1 in which a compound selected from the group consisting of BaO, PbO, CdO and ZnO is also present in said mixture, said compound replacing on a mole basis up to one-third of the alkaline earth metal oxide in said composition.

3. Composition according to claim 1 in which said composition also contains F in amounts up to 3 percent by weight.

4. Composition according to claim 1 in which said composition also contains $P_2O_5$ in amounts up to 4 percent by weight.

5. Composition according to claim 1 in which said composition also contains $Li_2O$, said compound replacing on a mole basis up to ⅓ of the sodium oxide.

6. Composition according to claim 1 in which $ZrO_2$ is also present in said mixture, the $ZrO_2$ replacing on a mole basis up to ½ of the $TiO_2$ in said composition.

References Cited in the file of this patent

UNITED STATES PATENTS

| | | |
|---|---|---|
| 2,859,138 | Blanchard | Nov. 8, 1958 |
| 2,890,964 | Commons et al. | June 16, 1959 |
| 2,909,438 | Kautz | Oct. 20, 1959 |
| 2,918,384 | Beals et al. | Dec. 22, 1959 |

OTHER REFERENCES

Jour. of American Cer. Soc., volumes 24–25, 1941–1942, pages 106–107.